(12) United States Patent
Behbahani et al.

(10) Patent No.: US 9,940,659 B1
(45) Date of Patent: Apr. 10, 2018

(54) CATEGORY PREFERRED LAYOUT FOR ITEMS IN AN ELECTRONIC MARKETPLACE

(71) Applicant: Amazon Technologies, Inc., Seattle, WA (US)

(72) Inventors: Aurash Steven Abnar Behbahani, Renton, WA (US); Sean Phillip Forde, Seattle, WA (US); Sai Sailesh Kopuri, Seattle, WA (US); Luis Antonio Diniz Fernandes de Morais Sarmento, Seattle, WA (US); Zheshen Wang, Bellevue, WA (US); Wei Zhang, Issaquah, WA (US)

(73) Assignee: Amazon Technologies, Inc., Seattle, WA (US)

( * ) Notice: Subject to any disclaimer, the term of this patent is extended or adjusted under 35 U.S.C. 154(b) by 650 days.

(21) Appl. No.: 14/575,800

(22) Filed: Dec. 18, 2014

(51) Int. Cl.
*G06Q 30/00* (2012.01)
*G06Q 30/06* (2012.01)
*G06F 17/30* (2006.01)

(52) U.S. Cl.
CPC ... *G06Q 30/0627* (2013.01); *G06F 17/30864* (2013.01); *G06Q 30/0625* (2013.01); *G06Q 30/0643* (2013.01)

(58) Field of Classification Search
CPC .......................................... G06Q 30/06–30/08
USPC .................................. 705/26.1–27.2
See application file for complete search history.

(56) References Cited

U.S. PATENT DOCUMENTS 9,276,855 B1 * 3/2016 Mengle ................... H04L 47/00

OTHER PUBLICATIONS

Heck, M., "Bullseye Pro Refines Web Searches" (Infoworld 21.10: 62(1). Infoworld Media Group, Mar. 8, 1999). https://dialog.proquest.com/professional/docview/666776251?accountid=142257 (Year: 1999).*

* cited by examiner

*Primary Examiner* — Ethan D Civan
(74) *Attorney, Agent, or Firm* — Kilpatrick Townsend & Stockton LLP

(57) ABSTRACT

Techniques for determining and providing a preferred layout of a network page may be provided. For example, the system may receive a query with a keyword, access data regarding previous users' interactions associated with the results of the keyword, determine a category associated with the interactions, and provide a display (e.g., on the original network page) for that particular category. In some examples, the system may provide generic network pages and item- or category-specific network pages associated with a particular layout or presentation characteristics. The system can identify the presentation characteristics of the category-specific network page and incorporate them with the generic network page, without redirecting the user to the category-specific network page.

20 Claims, 7 Drawing Sheets

US 9,940,659 B1

CATEGORY PREFERRED LAYOUT FOR ITEMS IN AN ELECTRONIC MARKETPLACE

BACKGROUND

Web pages of an electronic marketplace provide various options to search for items. For example, a user looking for a dress may type "red dress" into a search tool provided by a web page of a website of an electronic marketplace and be directed to a different web page of the website that features a particular red dress. Although the user may appreciate the customized layout for the red dress search result (e.g., a large image of the particular red dress, price, merchant, etc.), the user may not want to leave the main search web page. In some instances, the redirection may take the user to an incorrect web page (e.g., "pumps" can be shoes or bike accessories, each of which are associated with customized layouts for a specific item), causing the user frustration and time to navigate back to the main search page.

BRIEF DESCRIPTION OF THE DRAWINGS

Various embodiments in accordance with the present disclosure will be described with reference to the drawings, in which.

DETAILED DESCRIPTION

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Embodiments of the present disclosure are directed to, among other things, a system for determining and providing a preferred layout of a network page (e.g., a layout based in part on an item, keyword in the search query, or item category). The system may receive a search query with a keyword (e.g., a specific term or text string in the search query that is associated with a generic category of items), access data regarding previous users' interactions with search results from previous search queries associated with the same keyword, determine an item category (e.g., an attribute shared by similar items) utilizing the interactions, and enable to display search results (e.g., on the original network page) using a preferred layout (e.g., a favorable layout or format of displaying data associated with a particular category of items). In some examples, the system may provide generic network pages and item- or category-specific network pages associated with a preferred layout or other presentation characteristics. The system can identify the presentation characteristics of the category-specific network page and incorporate them with the generic network page, without redirecting the user to the category-specific network page.

In an illustrative example, a webpage provides an electronic search engine for a user device so that a user can search for items to order. A user types "red dress" as a search query on a generic search page (e.g., a network page that displays and/or provides access to searching of items from various categories, instead of a single category like apparel). The search engine accesses previous search queries by and navigation histories of other users and determines that previous users that provided search queries with the term "dress" tend to navigate to webpages associated with apparel after receiving search results from the queries. The search engine also determines that the item category "apparel" is associated with a preferred layout (e.g., larger and more images, fewer words, etc.). When the search engine returns results for the user's "red dress" query on the generic search page, the layout of the generic search page is modified to mimic the customized layout associated with the apparel category, without redirecting the user to the apparel page (e.g., a webpage showing several apparel items, a webpage showing one apparel item, etc.).

Figure 1:
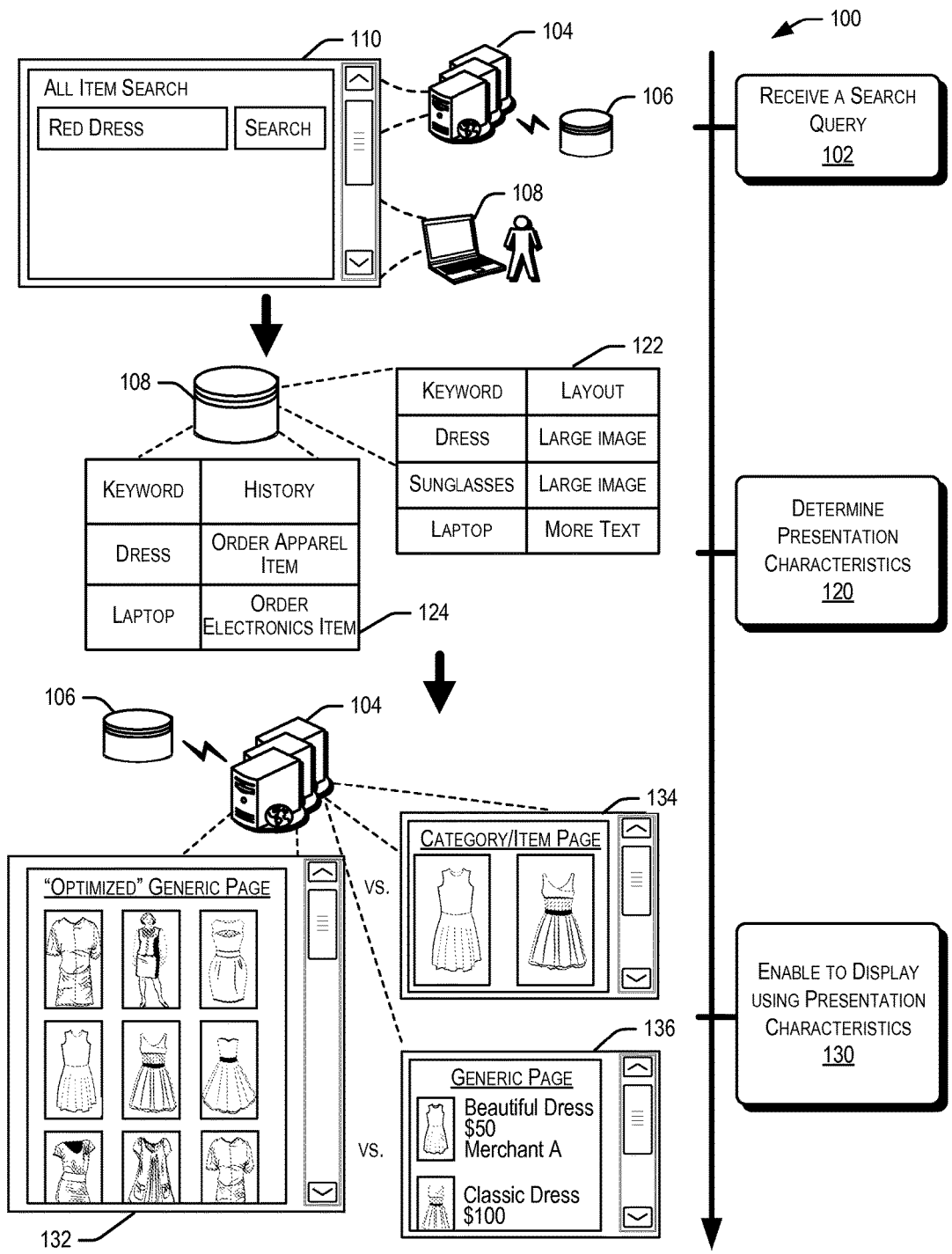
FIG. 1 illustrates an illustrative flow for determining and providing a preferred layout described herein, according to at least one example.

FIG. 1 illustrates an illustrative flow for determining and providing a preferred layout described herein, according to at least one example. The process 100 can begin with receiving a search query at 102. For example, a computing device 104 can interact with a data store 106 to access the search query, interact with a user device 108 to receive the search query directly, or present a network page 110 to receive the search query via the network page 110. For example, the user device 108 may access the network page 110 and type a text string as the search query (e.g., using one or more characters or symbols) into a search tool provided by the network page 110. The computing device 104 may store that search query in the data store 106. Other types of information may be stored with the data store 106 without diverting from the scope of the disclosure.

The process 100 may also determine presentation characteristics at 120. The presentation characteristics and information used to determine the presentation characteristics for a particular keyword may be stored in the data store 108 in one or more data tables. For example, a layout data table 122 can associate keywords with a presentation characteristic (e.g., fixed or grid layout, image resolution, dimensions, or sizes, image aspect ratios, number of words on a network page, etc.). As illustrated, keyword "dress" may be associated with a large image layout, keyword "sunglasses" may also be associated with a large image layout, and keyword "laptop" can be associated with more text strings (e.g., laptop specifications, item descriptions, etc.) instead of or in addition to the larger images.

The data store 108 may also include previous users' interactions or interaction history for a plurality of users (e.g., an action performed between a user computing device and network page, including pagination request, item detail request, request for images or more detail, rotation of an item, etc.). The corresponding interaction data may be stored in an interaction history data table 124 with results associated with the keyword and/or category. For example, fifty percent of the users that included the keyword "dress" may eventually order an item associated with an apparel category. The interaction history data table 124 can include this correlation between the keyword "dress" and the previous users' interactions with categories (e.g., searching for an apparel item, ordering an apparel item, requesting additional detail about a plurality of apparel items, etc.). Keyword "laptop" may be associated with ordering an item associated with an electronics category, and thus create a correlation between the keyword "laptop" and the previous users' interactions with the electronics category.

The process 100 may also enable to display an item, search results, a plurality of items, etc. using the presentation characteristics at 130. For example, the computing device 104 can provide one or more network pages based in part on the search query received from the user (e.g., a keyword included with the search query), previous users' interaction history associated with the keyword, and presentation characteristics associated with the keyword or category from the search query. As illustrated, the computing device 104 can enable to display a generic item search network page 132 (e.g., optimized generic network page) that includes a generic item search network page incorporating the preferred layout and/or presentation characteristics from the specific item search network page. The computing device 104 may alternatively enable to display a specific item search network page 134 or a generic item search network page 136 without incorporating the customized presentation characteristics (e.g., showing mostly text for an apparel item, not the preferred layout, etc.).

Figure 2:
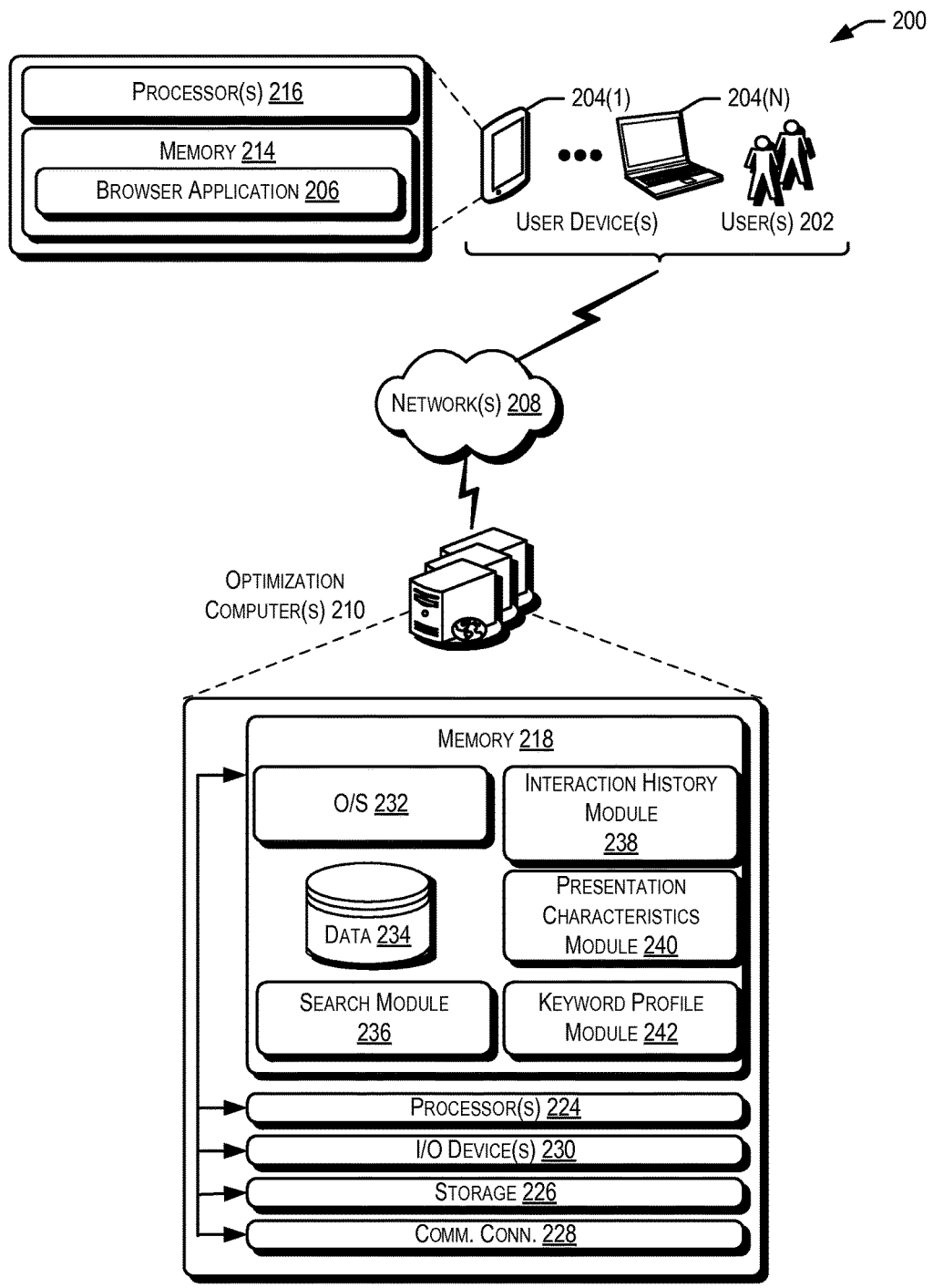
FIG. 2 illustrates an example architecture for determining and providing a preferred layout described herein that includes an optimization computer and/or a user device connected via one or more networks, according to at least one example.

FIG. 2 illustrates an example architecture for determining and providing a preferred layout described herein that includes an optimization computer and/or a user device connected via one or more networks, according to at least one example. In architecture 200, one or more users 202 (i.e., web browser users) may utilize user computing devices 204(1)-(N) (collectively, user devices 204) to access an application 206 (e.g., a web browser), via one or more networks 208. In some aspects, the application 206 may be hosted, managed, and/or provided by a computing resources service or service provider, such as by utilizing one or more service provider computers and/or one or more optimization computers 210. The one or more optimization computers 210 may, in some examples, provide computing resources such as, but not limited to, client entities, low latency data storage, durable data storage, data access, management, virtualization, cloud-based software solutions, electronic content performance management, etc. The one or more optimization computers 210 may also be operable to provide web hosting, computer application development, and/or implementation platforms, combinations of the foregoing, or the like to the one or more users 202. The one or more optimization computers 210, in some examples, may help determine and enable/provide for display a generic item search network page (e.g., with or without using the preferred layout) or a specific item search network page.

In some examples, the networks 208 may include any one or a combination of many different types of networks, such as cable networks, the Internet, wireless networks, cellular networks and other private and/or public networks. While the illustrated example represents the users 202 accessing the application 206 over the networks 208, the described techniques may equally apply in instances where the users 202 interact with the optimization computers 210 via the one or more user devices 204 over a landline phone, via a kiosk, or in any other manner. It is also noted that the described techniques may apply in other client/server arrangements (e.g., set-top boxes, etc.), as well as in non-client/server arrangements (e.g., locally stored applications, etc.).

As described briefly above, the application 206 may allow the users 202 to interact with a service provider computer, such as to access web content (e.g., web pages, music, video, etc.). The one or more optimization computers 210, perhaps arranged in a cluster of servers or as a server farm, may host the application 206 and/or cloud-based software services. Other server architectures may also be used to host the application 206. The application 206 may be capable of handling requests from many users 202 and serving, in response, various item web pages. The application 206 can provide any type of website that supports user interaction, including social networking sites, online retailers, informational sites, blog sites, search engine sites, news and entertainment sites, and so forth. As discussed above, the described techniques can similarly be implemented outside of the application 206, such as with other applications running on the user devices 204.

The user devices 204 may be any type of computing device such as, but not limited to, a mobile phone, a smart phone, a personal digital assistant (PDA), a laptop computer, a desktop computer, a thin-client device, a tablet PC, an electronic book (e-book) reader, etc. In some examples, the user devices 204 may be in communication with the optimization computers 210 via the networks 208, or via other network connections. Additionally, the user devices 204 may be part of the distributed system managed by, controlled by, or otherwise part of the optimization computers 210 (e.g., a console device integrated with the optimization computers 210).

In one illustrative configuration, the user devices 204 may include at least one memory 214 and one or more processing units (or processor(s)) 216. The processor(s) 216 may be implemented as appropriate in hardware, computer-executable instructions, firmware, or combinations thereof. Computer-executable instruction or firmware implementations of the processor(s) 216 may include computer-executable or machine-executable instructions written in any suitable programming language to perform the various functions described. The user devices 204 may also include geo-location devices (e.g., a global positioning system (GPS) device or the like) for providing and/or recording geographic location information associated with the user devices 204.

The memory 214 may store program instructions that are loadable and executable on the processor(s) 216, as well as data generated during the execution of these programs. Depending on the configuration and type of user device 204, the memory 214 may be volatile (such as random access memory (RAM)) and/or non-volatile (such as read-only memory (ROM), flash memory, etc.). The user device 204 may also include additional removable storage and/or non-removable storage including, but not limited to, magnetic storage, optical disks, and/or tape storage. The disk drives and their associated computer-readable media may provide non-volatile storage of computer-readable instructions, data structures, program modules, and other data for the computing devices. In some implementations, the memory 214 may include multiple different types of memory, such as static random access memory (SRAM), dynamic random access memory (DRAM), or ROM.

Turning to the contents of the memory 214 in more detail, the memory 214 may include an operating system and one or more application programs or services for implementing the features disclosed herein, such as via the browser application 206 or dedicated applications (e.g., smart phone applications, tablet applications, etc.). The browser application 206 may be configured to receive, store, and/or display a website or other interface for interacting with the optimization computers 210. Additionally, the memory 214 may store access credentials and/or other user information such as, but not limited to, user IDs, passwords, and/or other user information. In some examples, the user information may include information for authenticating an account access request such as, but not limited to, a device ID, a cookie, an IP address, a location, or the like. In addition, the user information may include a user 202 provided response to a security question or a geographic location obtained by the user device 204.

In some aspects, the optimization computers 210 may also be any type of computing devices such as, but not limited to, a mobile phone, a smart phone, a personal digital assistant (PDA), a laptop computer, a desktop computer, a server computer, a thin-client device, a tablet PC, etc. Additionally, it should be noted that in some embodiments, the service provider computers are executed by one more virtual machines implemented in a hosted computing environment. The hosted computing environment may include one or more rapidly provisioned and released computing resources, which computing resources may include computing, networking and/or storage devices. A hosted computing environment may also be referred to as a cloud computing environment. In some examples, the optimization computers 210 may be in communication with the user devices 204 and/or other service providers via the networks 208, or via other network connections. The optimization computers 210 may include one or more servers, perhaps arranged in a cluster, as a server farm, or as individual servers not associated with one another. These servers may be configured to implement the content performance management described herein as part of an integrated, distributed computing environment.

In one illustrative configuration, the optimization computers 210 may include at least one memory 218 and one or more processing units (or processor(s)) 224. The processor(s) 224 may be implemented as appropriate in hardware, computer-executable instructions, firmware, or combinations thereof. Computer-executable instruction or firmware implementations of the processor(s) 224 may include computer-executable or machine-executable instructions written in any suitable programming language to perform the various functions described.

The memory 218 may store program instructions that are loadable and executable on the processor(s) 224, as well as data generated during the execution of these programs. Depending on the configuration and type of optimization computers 210, the memory 218 may be volatile (such as RAM) and/or non-volatile (such as ROM, flash memory, etc.). The optimization computers 210 or servers may also include additional storage 226, which may include removable storage and/or non-removable storage. The additional storage 226 may include, but is not limited to, magnetic storage, optical disks and/or tape storage. The disk drives and their associated computer-readable media may provide non-volatile storage of computer-readable instructions, data structures, program modules and other data for the computing devices. In some implementations, the memory 218 may include multiple different types of memory, such as SRAM, DRAM, or ROM.

The memory 218, the additional storage 226, both removable and non-removable, are all examples of computer-readable storage media. For example, computer-readable storage media may include volatile or non-volatile, removable or non-removable media implemented in any method or technology for storage of information such as computer-readable instructions, data structures, program modules, or other data. The memory 218 and the additional storage 226 are all examples of computer storage media. Additional types of computer storage media that may be present in the optimization computers 210 may include, but are not limited to, PRAM, SRAM, DRAM, RAM, ROM, EEPROM, flash memory or other memory technology, CD-ROM, DVD or other optical storage, magnetic cassettes, magnetic tape, magnetic disk storage or other magnetic storage devices, or any other medium which can be used to store the desired information and which can be accessed by the optimization computers 210. Combinations of any of the above should also be included within the scope of computer-readable media.

Alternatively, computer-readable communication media may include computer-readable instructions, program modules, or other data transmitted within a data signal, such as a carrier wave, or other transmission. However, as used herein, computer-readable storage media does not include computer-readable communication media.

The optimization computers 210 may also contain communications connection(s) 228 that allow the optimization computers 210 to communicate with a stored database, another computing device or server, user terminals and/or other devices on the networks 208. The optimization computers 210 may also include I/O device(s) 230, such as a keyboard, a mouse, a pen, a voice input device, a touch input device, a display, speakers, a printer, etc.

Turning to the contents of the memory 218 in more detail, the memory 218 may include an operating system 232, one or more data stores 234, and/or one or more application programs or services for implementing the features disclosed herein including a search module 236, interaction history module 238, presentation characteristics module 240, and/or keyword profile module 242. The modules may be software modules, hardware modules, or a combination thereof. If the modules are software modules, the modules will be embodied on a computer readable medium and processed by a processor in any of computer systems described herein. In some examples, the search module 236 may be configured to receive a search query submitted by a user and/or identify a keyword associated with the search query. In some examples, the search module 236 may store information associated with the search query with the one or more data stores 234.

The interaction history module 238 may be configured to determine, access, and analyze interactions between one or more network pages and one or more users. The interaction history may include interactions by the users with search results from the search query (e.g., in communication with the search module 236), pagination requests, or any other interaction between a user device 204 and the network page(s) provided by the optimization computers 210.

The presentation characteristics module 240 may be configured to store, access, and enable to display information about an item, including search results associated with the search query or category of items. For example, the presentation characteristics module 240 may be configured to display one or more images of the item (e.g., when the preferred layout requires more images than text, when the preferred layout requires a number of images to be displayed, etc.), or configured to display more text of the item (e.g., when the preferred layout requires more text strings than images).

The keyword profile module 242 may be configured to associate a keyword, item, or search query with a category. In some examples, the keyword profile module 242 may store the association between the keyword and the category with one or more data stores 234. Additional information about the keyword profile is provided with FIG. 6.

Figure 3:
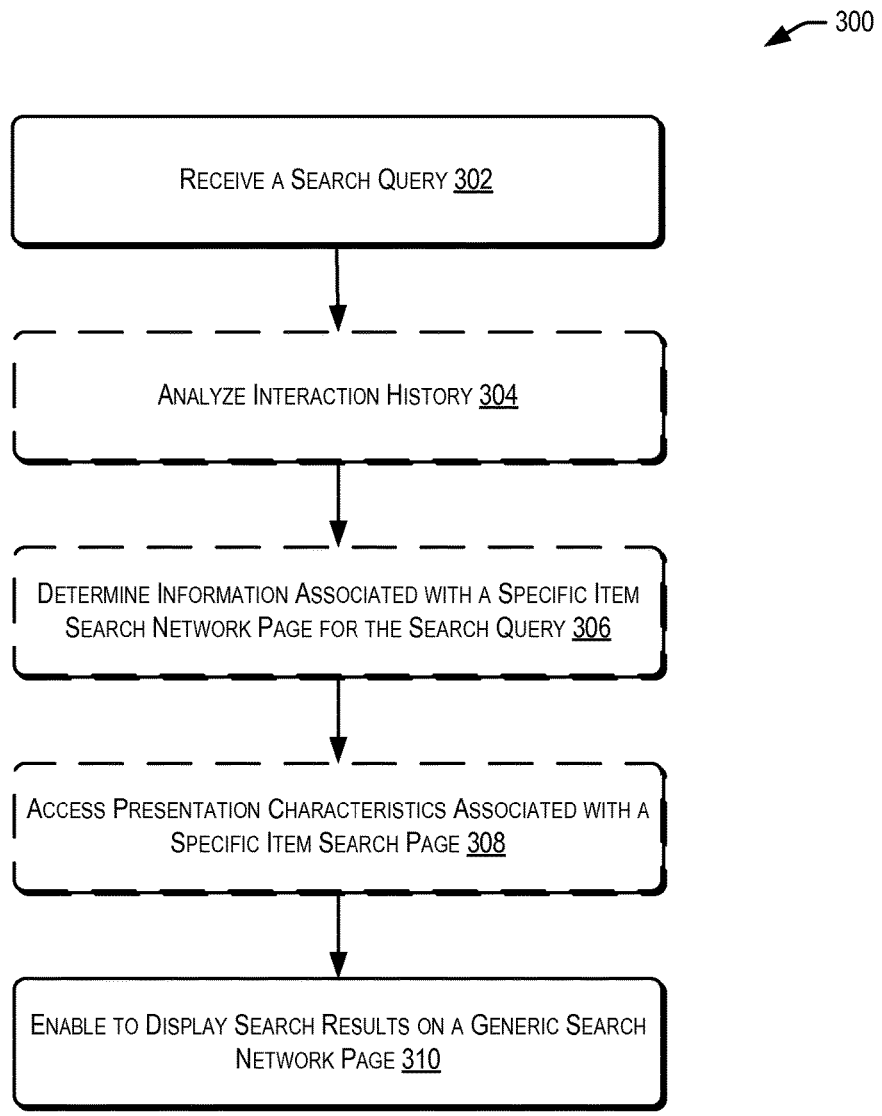
FIG. 3 illustrates an example flow diagram for determining and providing a preferred layout described herein, according to at least one example.

FIG. 3 illustrates an example flow diagram for determining and providing a preferred layout described herein, according to at least one example. In some examples, the one or more optimization computers 210 (e.g., utilizing at least one of the search module 236, the interaction history module 238, the presentation characteristics module 240, and/or the keyword profile module 242) or one or more user devices 204 shown in FIG. 2 may perform the process 300 of FIG. 3. The process 300 may begin at 302 by receiving a search query. The search query can include a keyword for an item. For example, the optimization computers 210 may provide a network page that is accessible by a user computing device. The user computing device may provide the search query (e.g., speak, type, activate a text string that includes a keyword or reference to an item, etc.) for the network page. In some examples, the search query is submitted by the user via a generic item search network page of an electronic marketplace (e.g., one or more network pages that provide a plurality of merchants and/or a plurality of items, etc.). The electronic marketplace can offer items for sale over a plurality of different categories.

At 304, the interaction history may optionally be analyzed. For example, the optimization computers 210 may analyze interaction history for a plurality of users based upon a plurality of previous interactions by the plurality of users. The interactions can include interactions by the users with search results provided by the electronic marketplace responsive to the keyword (e.g., search results, navigation tools, etc.) or other interactions discussed throughout the disclosure.

In some examples, accessing and/or analyzing interaction history may occur before the search query is received. The optimization computers 210 may perform a process to identify the interaction history for a plurality of users (e.g., once per day, once per hour, off-line instead of real time, etc.). The interaction history may be stored in one or more data stores 234. Once the search query is received, the optimization computers 210 may access the pre-analyzed interaction history instead of analyzing the interaction history after the search query is received.

At 306, information associated with a specific item search network page for the search query may optionally be determined. For example, the optimization computers 210 may identify a single category associated with the interactions of the user. In some examples, the specific item search network page is associated with the category or the keyword (e.g., from the search query).

At 308, presentation characteristics may optionally be accessed that are associated with the specific item search network page. For example, the optimization computers 210 may access and/or obtain one or more presentation characteristics for the category (e.g., the single category associated with the keyword, etc.). The presentation characteristics may include a preferred layout associated with the category (e.g., more images, less text, more description, etc.).

At 310, search results may be provided and/or enabled to be displayed on a generic search network page. For example, the optimization computers 210 may provide the generic search network page in the preferred format (e.g., the preferred format may be associated with the specific item search network page). In some examples, a subsequent interaction can include a request to access the specific item search network page (e.g., which might navigate the user away from the generic search network page).

Figure 4:
FIG. 4 illustrates an example of a generic item search network page described herein, according to at least one example.

FIG. 4 illustrates an example of a generic item search network page described herein, according to at least one example. In illustration 400, a generic item search network page that does not use a preferred layout is provided. The generic item search network page may receive a query. For example, the one or more optimization computers 210 may receive a query submitted by a user that includes a keyword. The optimization computers 210 may parse or otherwise determine the keyword using methods known in the art. As illustrated, the search query includes the text string "red dress" and the keyword includes the text string "dress."

In some examples, the item associated with the query and/or keyword is offered by a merchant through an electronic marketplace. The electronic marketplace can offer the item for sale over a plurality of different categories (e.g., apparel, electronics, shoes, etc.).

The layout of the generic item search network page may display one or more items or search results in a fixed layout. The fixed layout may include a container element (e.g., in HTML, PHP, or defined through other web programming languages) that identifies fixed widths of one or more components displayed on the network page (e.g., 550 pixels, 200 pixels, 1-inch, etc.). The container element may maintain a consistent percentage of area of the screen display. For example, a user's screen resolution (e.g., 1920×200, etc.) may not affect the container elements, so that, a different user (e.g., with screen resolutions of 800×600 or 1440×900, etc.) can see the same width of images the user. In some examples, a fluid layout may be used (e.g., percentage widths of one or more components instead of fixed widths) without diverting from the scope of the disclosure.

In some examples, the generic item search network page may be associated with a generic layout before the generic item search network page is provided with a preferred layout. The generic layout may be consistent or static across the plurality of different categories (e.g., all categories display images with a three-by-four (3×4) aspect ratio, 100-width pixels, or three bullet points with text strings, etc.).

Figure 5:
FIG. 5 illustrates an example of a generic item search network page using a preferred layout described herein, according to at least one example.

FIG. 5 illustrates an example of a generic item search network page using a preferred layout described herein, according to at least one example. In illustration 500, a generic item search network page using a preferred layout (e.g., optimized generic network page) is provided. In some examples, the generic item search network page may maintain a fixed layout as shown in FIG. 4, but the formatting of the layout may be adjusted based in part on the search query, keyword, and/or category.

The generic item search network page using the preferred layout may provide several benefits. For example, by moving the user to the specific item search network page, the search results may be reduced in comparison to providing the search results through the generic item search network page. In an example illustration, the search term may include "pumps." In ninety-percent of the search queries, the users may want to receive search results associated with women's shoes and in the other ten-percent of the search queries, the users may want to receive search results associated with bicycle parts (e.g., bike "pumps"). By directing the user to shoe or apparel specific item search network pages, the user may not receive search results directed to bike pumps (e.g., because they are filtered, removed, hidden from the search results on the specific item search network page). The user may think that there are no items available associated with bike pumps since bike pumps cannot be displayed with shoes, but in fact, an erroneous filter was applied to the search results of an ambiguous search query. To prevent this, the search results may be provided through the generic item search network page. The generic item search network page may mimic the preferred layout associated with the specific item search network page.

Figure 6:
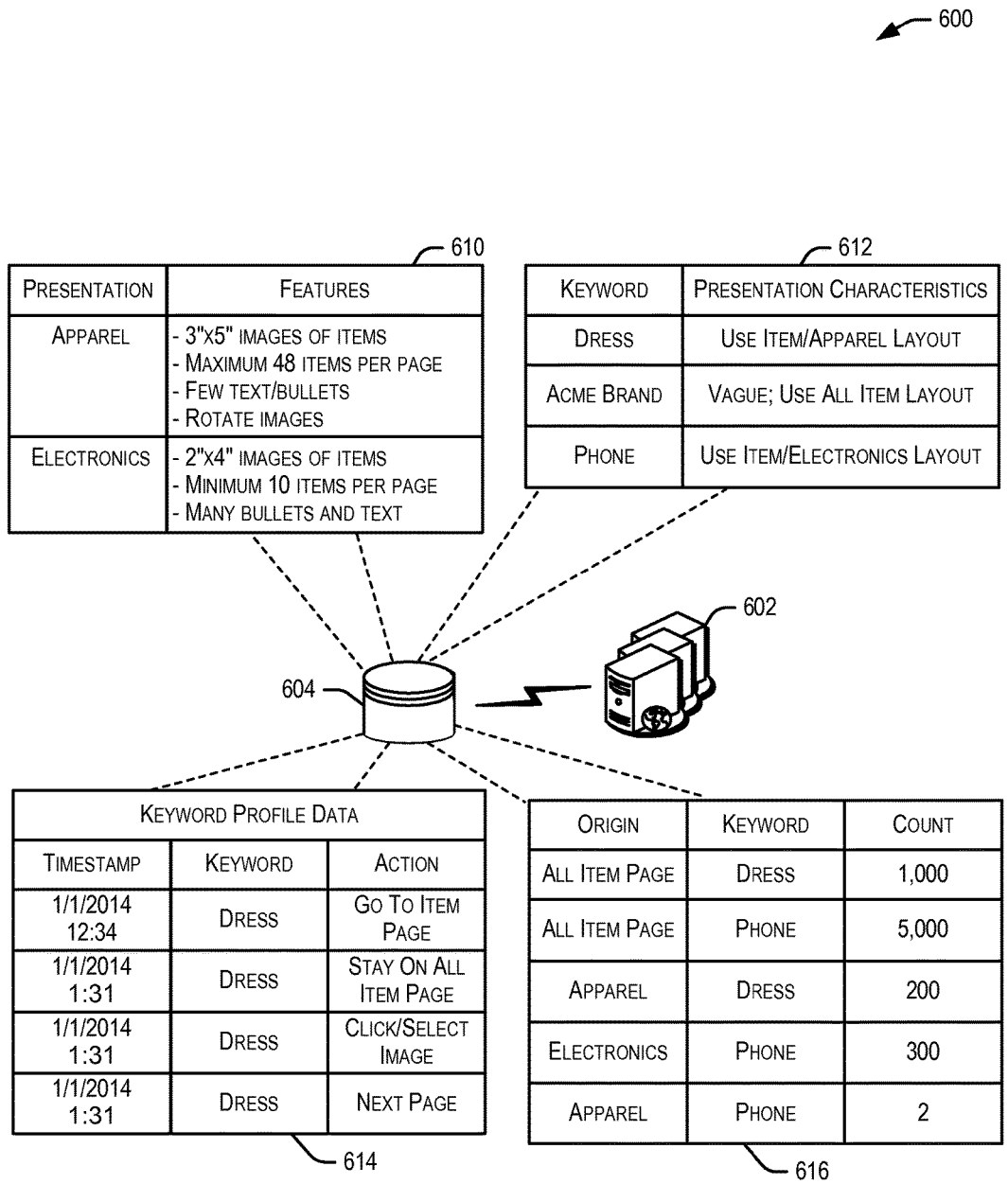
FIG. 6 illustrates example data that may be used to determine and provide a preferred layout described herein, according to at least one example.

The preferred layout may be based in part on interaction data, as described with FIG. 6. For example, the optimization computers 210 can determine the interaction data as a plurality of previous interactions by a plurality of users associated with search results from the electronic marketplace responsive to the search query. The interactions may be analyzed in real-time or during a process that runs at pre-defined intervals (e.g., once per hour, once per day, etc.). In some examples, the previous interactions include a frequency of use of a presentation feature (e.g., presenting images of the item on a specific item, presenting text of item attributes associated with the item, etc.). In some examples, the previous interactions may identify the particular search network page (e.g., fifty-percent of the interactions involve viewing multiple images of the item, 75% of the interactions involve browsing to the detailed description of the item on the network page, etc.). Patterns or commonalities within the plurality of previous interactions may be recognized to help associate a search query with a category (e.g., where each category is associated with a preferred layout).

The preferred layout associated with the category may optimize item attributes of the search results that are identified as preferred or important to the plurality of users. For example, when the users frequently access detailed images of the item, multiple detailed images of the item, rotating images of the item, or other types of images of the item, the "images" (in one or more formats) may be determined important to users in the particular category. The preferred layout may incorporate the importance of images with the category. Additional information associated with interaction data is provided with FIG. 6.

The category selected by the users in the interactions may be more than a threshold amount. For example, the threshold may include fifty-percent of all search actions, thirty-percent of all users that browse to a particular item search page, or other metrics that may serve as a threshold. When the interaction history of the other users identifies a correlation between the search query or keyword and the category (e.g., most users visit the apparel network page when they provide a search term with the word "dress" in it, etc.), the threshold may be met or exceeded. In some examples, the presentation characteristics associated with that category may correspond with the search query or keyword. The generic item search network page may be updated to display the presentation characteristics with search results according to the identified presentation characteristics.

In some examples, the user may be directed to a specific item search network page. For example, after the search results are displayed for the user, the user may activate (e.g., select, click, speak, etc.) a search tool on the generic item search network page. The subsequent interaction can include a request to access the specific item search network page (e.g., via a toolbar, etc.). The optimization computers 210 may display the specific item search network page (e.g., instead of the generic item search network page with the preferred layout).

In some examples, the search query may be associated with more than one category. For example, as illustrated with an ambiguous search query (e.g., "pumps"), the optimization computers 210 may determine that the search query is associated with more than one category. This determination may be based at least in part on a plurality of previous interactions by the plurality of users (e.g., in ninety-percent of the search queries, the users may want to receive search results associated with women's shoes (by ordering a particular pair of women's shoes) and ten-percent of the search queries, the users may want to receive search results associated with bike pumps (by accessing bike pump related network pages longer than a threshold amount of time)).

In some examples, the preferred layout for the search query may include a consistent or static layout across the plurality of different categories for the generic item search network page (e.g., when the search query is ambiguous, etc.). As an illustration, if the bike pumps and women's shoes/pumps are both associated with bullet point descriptions instead of paragraph descriptions, the consistent presentation characteristic and/or layout may include the bullet point descriptions. In some examples, the generic item search network page using the preferred layout may include bullet point descriptions.

In some examples, the pagination is modified on the generic item search network page using the preferred layout. For example, the modified pagination may include more items per page to show more item attributes (e.g., top or side views, the item being worn by a mannequin, etc.). This layout may help users that observe more items prior to committing to a purchase (e.g., in a particular category) without selecting additional network pages. In some examples, the pagination may correspond with a maximum number of images and/or items per page (e.g., maximum of 48 items per page) or minimum number (e.g., at least 10 item per page).

In some examples, the method of displaying images is modified on the generic item search network page using the preferred layout. For example, the images may be rotated (e.g., a 360-degree view of a mannequin wearing a dress, image/video, a user hovering over an image of an item which activates multiple images at different angles displayed for the user in response to the hovering, etc.) or multiple images may be provided to show multiple angles of the item (e.g., the front and back of the dress, etc.). Fewer text strings may be displayed as well (e.g., using bullet points instead of paragraph descriptions, etc.).

In some examples, a confidence level may affect the modification of the generic item search network page using the preferred layout. For example, when the previous interactions correspond with a category above a threshold number of times (e.g. more than 95%), the optimization computers 210 may correlate the category with a high confidence level (e.g., the user may be very likely look for an item in this particular category). The optimization computers 210 may determine a low confidence level as well (e.g., when the previous interactions correspond with a category below a threshold number of times or multiple categories). The confidence level may help determine whether to provide a generic item search network page with a preferred layout or a generic item search network page without a preferred layout for the user.

The data may be analyzed to increase the precision (e.g., a keyword corresponding to a category) or confidence associated with a keyword and category. For example, the interactions may be considered if the number of interactions meet or exceed a threshold (e.g., corresponding to a low confidence value). In another example, the number of users accessing different network pages being may be less than a threshold amount of users (e.g., corresponding to a low confidence value).

In some examples, the data may not be detailed enough to create a correlation between a keyword corresponding to a category (e.g., an ambiguous query). For example, the ambiguous search queries or keywords may correspond (e.g., map) to different categories, so that some of the keywords may not be included in the interaction data. In some examples, the preferred layout can be used when the confidence levels are above a threshold and/or not ambiguous. As an illustration, the keyword may be "Acme Brand" which is a company associated with many types of items in many different categories (e.g., movies, books, action figures, apparel, etc.). The keyword "Acme Brand" may be ambiguous. In some examples, the keyword may not be associated with a particular category, so that a default preferred layout is displayed with the generic search item network page (e.g., standard-sized images, static layout, an average amount of descriptive text, a network page provided in FIG. 4, etc.).

FIG. 6 illustrates example data that may be used to determine and provide a preferred layout described herein, according to at least one example. In illustration 600, a computing device 602 interacts with a data store 604. Examples of the computing device 602 and data store 604 are illustrated in FIG. 2 as the optimization computers 210 and data store 234, respectively.

Interaction data may help determine a preferred layout associated with a search query (e.g., keyword, category, etc.). The interaction data may include purchase information, user interaction and behavior (e.g., past or present users, customers of the electronic marketplace, etc.), result information, individual item information, or other data. In some examples, only one type of data is used (e.g., user interaction and behavior data).

The computing device 602 may build a data set that summarizes previous interactions with one or more search queries. For example, if the user types "blue dress" as a search query, the previous users' interactions and behaviors include interactions with fashion network pages or other the portions of the electronic marketplace associated with apparel. When the interactions in a particular category meet or exceed a threshold or the interactions are greater than interactions with other portions of the electronic marketplace (e.g., electronics), the keyword and category may be related through user interaction data. In some examples, the summarized interactions can comprise a keyword profile to quickly identify commonly used or searched categories, or categories that the users mostly interacted with after using a particular search query in a given part of the electronic marketplace.

The data store 604 may include presentation characteristics associated with category data 610. For example, the presentation characteristics may identify a minimum number of items to display to the user as search results (e.g., minimum of ten items, minimum two network pages of items, etc.). The presentation characteristics may identify a minimum number of images for each item or image rotation to display to the user as search results (e.g., minimum of ten images of items, minimum one video of the item in motion, etc.). The presentation characteristics may identify an aspect ratio, dimensions, or image resolution for one or more items to display to the user as search results. The presentation characteristics can also include a preferred minimum or maximum number of items to display on specific item search network page. The one or more presentation characteristics include a grid layout or list layout (e.g., to display the search results in a grid layout, to display the search results in a list layout, etc.).

As illustrated, the presentation characteristics associated with a category data 610 can include a category (e.g., apparel) and presentation characteristics associated with the category (e.g., 3"×5" images of items, maximum of 48 items per network page, few text/bullets, rotate images, etc.). In another illustration, the presentation characteristics associated with category data 610 can include a category (e.g., electronics) and presentation characteristics associated with the category (e.g., 2"×4" images of items, minimum ten items per page, many bullets and text, etc.). In some examples, a number of images to view per page can correspond with the category (e.g., maximum 48 items to display for apparel, 16 items to display for electronics, 24 items to list for electronics, etc.). Other minimums, maximums, limits, specifications, or other constraints may be implemented without diverting from the scope of the disclosure.

The data store 604 may include presentation characteristics associated with keyword data 612. For example, when one or more presentation characteristics are associated with a category, a keyword may also be associated with a category and (transitively) associated with the one or more presentation characteristics. As illustrated, the presentation characteristics associated with keyword data 612 include a keyword (e.g., dress) and presentation characteristics associated with the keyword (e.g., use item/apparel layout). In another illustration, the presentation characteristics associated with keyword data 612 can include a keyword (e.g., Acme Brand) and presentation characteristics associated with the keyword (e.g., vague; use all item layout). In another illustration, the presentation characteristics associated with keyword data 612 can include a keyword (e.g., phone) and presentation characteristics associated with the keyword (e.g., use item/electronics layout).

The data store 604 may include keyword profile data 614. The keyword profile can include a source (e.g., which network page the user was on when the action was performed) and a destination (e.g., which network page the user was on after the action was performed). Keyword profile data 614 may also include a timestamp of the action, keyword, and action (e.g., next page or pagination request, etc.). As illustrated, the identified keyword from the search query is "dress" and the user performed several actions after the search query was provided (e.g., go to item page, stay on all item page, click or select an image, browse to the next page, etc.) at particular times.

The keyword profile data 614 can include mapping data. For example, for a keyword, the computing device 602 can count the number of times that that keyword has been queried from different parts of the electronic marketplace. The distribution of origins and destinations can be tracked as part of the keyword profile.

The data store 604 may include interaction history data 616. The interaction history data 616 can include interaction history for a plurality of users. The interaction history can include various data, including previous purchase history (e.g., for one user, a plurality of users, etc.), order history (e.g., items that were ordered but not purchased, in transit, obtained through credit/auction, etc.), clickstream data (e.g., information a user passively behind when visiting a network page), or other relevant data. The previous interactions may include at least one of a pagination request, selecting the category on a network page, or activating a link on the network page. In some examples, the previous interactions may be limited to interactions within related network pages associated with the category.

Other data may be identified or analyzed as well. In some examples, a "behavioral strategy" can include collected information associated with interactions of users. The behavioral strategy may identify a standard behavior of a majority of users that have acted in a particular way. The number of interactions may be expansive (e.g., thousands, hundreds of thousands, etc.). For example, the interactions may include every time the user clicks on a part of the electronic marketplace (e.g., next page or pagination request, a shortcut on a navigation menu, an activation of an item detail network page, etc.).

In a sample illustration, the search query includes "red dress." Instead of using the example implementations of the disclosure that incorporate a preferred layout, the computing device 602 may display a list of search results that the user may interact with (e.g., via the navigation tool bar, by selecting a link to a particular item, etc.). When the user interacts with that navigation tool bar, the user may "opt-in" to a certain portion of the electronic marketplace (e.g., by selecting "fashion," "shoes," "apparel for men," etc.), including the specific item search network page for that interaction. The interactions may be tracked in association with an opt-in by the user (e.g., "red dress" search query, selecting "dress" from a navigation menu involves opting-in to the dress portion of the electronic marketplace, etc.). One or more of the subsequent actions after the opt-in may be associated with the keyword and/or interaction data. These subsequent interactions can include pagination, activating sub-network pages in the electronic marketplace, providing a new search query, and the like.

In some examples, network traffic is analyzed (e.g., instead of an opt-in), including a fraction of network traffic (e.g., after submitting a search query) that is conducted with a specific network page instead of the generic network page. For example, the "red dress" search query might correspond with most of the search interaction under a specific network page (e.g., 60% of the interactions are apparel) versus of the generic network page (e.g., 40%). In another example, the distribution of interactions is determined by comparing the interactions with the generic network page and a specific network page (e.g., to identify the category associated with the search query based in part on past interactions).

Illustrative methods and systems for determining and providing a preferred layout are described above. Some or all of these systems and methods may, but need not, be implemented at least partially by architectures such as those shown at least in FIGS. 1-6 above.

Figure 7:
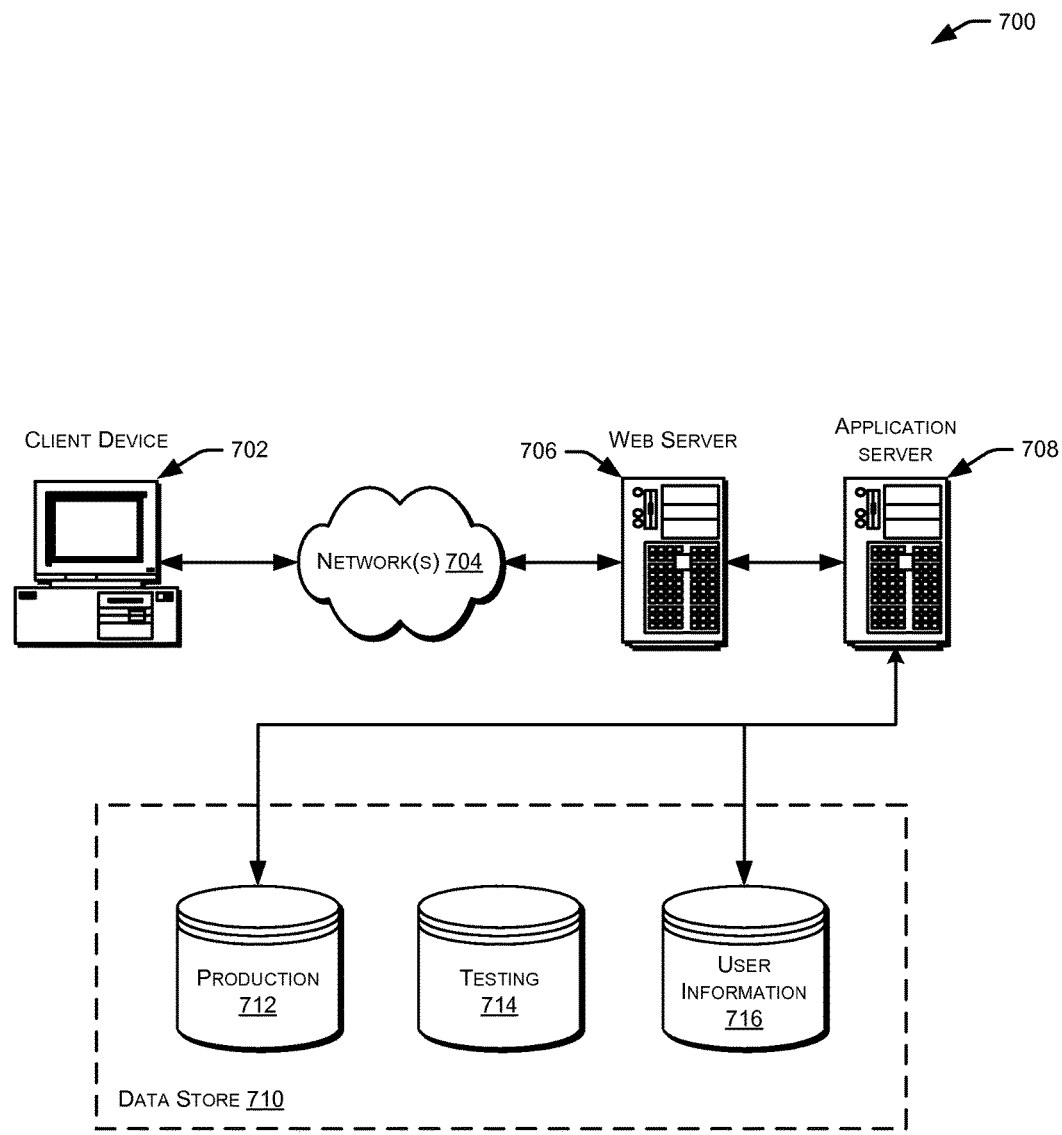
FIG. 7 illustrates an environment in which various embodiments of determining and providing a preferred layout can be implemented, according to at least one example.

FIG. 7 illustrates aspects of an example environment 700 for implementing aspects in accordance with various embodiments. As will be appreciated, although a Web-based environment is used for purposes of explanation, different environments may be used, as appropriate, to implement various embodiments. The environment includes an electronic client device 702, which can include any appropriate device operable to send and receive requests, messages, or information over an appropriate network 704 and convey information back to a user of the device. Examples of such client devices include personal computers, cell phones, handheld messaging devices, laptop computers, set-top boxes, personal data assistants, electronic book readers, and the like. The network can include any appropriate network, including an intranet, the Internet, a cellular network, a local area network or any other such network or combination thereof. Components used for such a system can depend at least in part upon the type of network and/or environment selected. Protocols and components for communicating via such a network are well known and will not be discussed herein in detail. Communication over the network can be enabled by wired or wireless connections and combinations thereof. In this example, the network includes the Internet, as the environment includes a Web server 706 for receiving requests and serving content in response thereto, although for other networks an alternative device serving a similar purpose could be used as would be apparent to one of ordinary skill in the art.

The illustrative environment includes at least one application server 708 and a data store 710. It should be understood that there can be several application servers, layers, or other elements, processes or components, which may be chained or otherwise configured, which can interact to perform tasks such as obtaining data from an appropriate data store. As used herein the term "data store" refers to any device or combination of devices capable of storing, accessing, and/or retrieving data, which may include any combination and number of data servers, databases, data storage devices and data storage media, in any standard, distributed or clustered environment. The application server can include any appropriate hardware and software for integrating with the data store as needed to execute aspects of one or more applications for the client device, handling a majority of the data access and business logic for an application. The application server provides access control services in cooperation with the data store, and is able to generate content such as text, graphics, audio and/or video to be transferred to the user, which may be served to the user by the Web server in the form of HTML, XML or another appropriate structured language in this example. The handling of all requests and responses, as well as the delivery of content between the client device 702 and the application server 708, can be handled by the Web server. It should be understood that the Web and application servers are not required and are merely example components, as structured code discussed herein can be executed on any appropriate device or host machine as discussed elsewhere herein.

The data store 710 can include several separate data tables, databases or other data storage mechanisms and media for storing data relating to a particular aspect. For example, the data store illustrated includes mechanisms for storing production data 712 and user information 716, which can be used to serve content for the production side. The data store also is shown to include a mechanism for storing log data 714, which can be used for reporting, analysis, or other such purposes. It should be understood that there can be many other aspects that may need to be stored in the data store, such as for page image information and to access right information, which can be stored in any of the above listed mechanisms as appropriate or in additional mechanisms in the data store 710. The data store 710 is operable, through logic associated therewith, to receive instructions from the application server 708 and obtain, update or otherwise process data in response thereto. In one example, a user might submit a search request for a certain type of item. In this case, the data store might access the user information to verify the identity of the user, and can access the catalog detail information to obtain information about items of that type. The information then can be returned to the user, such as in a results listing on a web page that the user is able to view via a browser on the user device 702. Information for a particular item of interest can be viewed in a dedicated page or window of the browser.

Each server typically will include an operating system that provides executable program instructions for the general administration and operation of that server, and typically will include a computer-readable storage medium (e.g., a hard disk, random access memory, read only memory, etc.) storing instructions that, when executed by a processor of the server, allow the server to perform its intended functions. Suitable implementations for the operating system and general functionality of the servers are known or commercially available, and are readily implemented by persons having ordinary skill in the art, particularly in light of the disclosure herein.

The environment in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 7. Thus, the depiction of the system 700 in FIG. 7 should be taken as being illustrative in nature, and not limiting to the scope of the disclosure.

The various embodiments further can be implemented in a wide variety of operating environments, which in some cases can include one or more user computers, computing devices or processing devices which can be used to operate any of a number of applications. User or client devices can include any of a number of general purpose personal computers, such as desktop or laptop computers running a standard operating system, as well as cellular, wireless and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems and other devices capable of communicating via a network.

Most embodiments utilize at least one network that would be familiar to those skilled in the art for supporting communications using any of a variety of commercially-available protocols, such as TCP/IP, OSI, FTP, UPnP, NFS, CIFS, and AppleTalk®. The network can be, for example, a local area network, a wide-area network, a virtual private network, the Internet, an intranet, an extranet, a public switched telephone network, an infrared network, a wireless network, and any combination thereof.

In embodiments utilizing a Web server, the Web server can run any of a variety of server or mid-tier applications, including HTTP servers, FTP servers, CGI servers, data servers, Java servers, and business application servers. The server(s) also may be capable of executing programs or scripts in response requests from user devices, such as by executing one or more Web applications that may be implemented as one or more scripts or programs written in any programming language, such as Java®, C, Visual C#® or C++, or any scripting language, such as Perl®, Python® or TCL, as well as combinations thereof. The server(s) may also include database servers, including without limitation those commercially available from Oracle®, Microsoft®, Sybase®, and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network (SAN) familiar to those skilled in the art. Similarly, any necessary files for performing the functions attributed to the computers, servers or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch screen or keypad), and at least one output device (e.g., a display device, printer or speaker). Such a system may also include one or more storage devices, such as disk drives, optical storage devices, and solid-state storage devices such as RAM or ROM, as well as removable media devices, memory cards, flash cards, etc.

Such devices also can include a computer-readable storage media reader, a communications device (e.g., a modem, a network card (wireless or wired), an infrared communication device, etc.) and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services or other elements located within at least one working memory device, including an operating system and application programs, such as a client application or Web browser. It should be appreciated that alternate embodiments may have numerous variations from that described above. For example, customized hardware might also be used and/or particular elements might be implemented in hardware, software (including portable software, such as applets) or both. Further, connection to other computing devices such as network input/output devices may be employed.

Storage media and computer-readable media for containing code, or portions of code, can include any appropriate media known or used in the art, including storage media and communication media, such as but not limited to volatile and non-volatile, removable and non-removable media implemented in any method or technology for storage and/or transmission of information such as computer-readable instructions, data structures, program modules or other data, including RAM, ROM, EEPROM, flash memory or other memory technology, CD-ROM, DVD, or other optical storage, magnetic cassettes, magnetic tape, magnetic disk storage or other magnetic storage devices or any other medium which can be used to store the desired information and which can be accessed by the a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the disclosure to the specific form or forms disclosed, but on the contrary, the intention is to cover all modifications, alternative constructions and equivalents falling within the spirit and scope of the disclosure, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments of the disclosure and does not pose a limitation on the scope of the disclosure unless otherwise claimed. No language in the specification should be construed as indicating any non-claimed element as essential to the practice of the disclosure.

Disjunctive language such as that included in the phrase "at least one of X, Y, or Z," unless specifically stated otherwise, is otherwise understood within the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, and/or at least one of Z in order for each to be present.

Preferred embodiments of this disclosure are described herein, including the best mode known to the inventors for carrying out the disclosure. Variations of those preferred embodiments may become apparent to those of ordinary skill in the art upon reading the foregoing description. The inventors expect skilled artisans to employ such variations as appropriate, and the inventors intend for the disclosure to be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

All references, including publications, patent applications, and patents, cited herein are hereby incorporated by reference to the same extent as if each reference were individually and specifically indicated to be incorporated by reference and were set forth in its entirety herein.

What is claimed is:

1. One or more computer-readable storage media collectively storing computer-executable instructions that, when executed by one or more computer systems, configure the one or more computer systems to collectively perform operations comprising:
    receiving a search query submitted by a user via a generic item search network page of an electronic marketplace, the electronic marketplace offering items for sale over a plurality of different categories, the generic item search network page configured to display items from at least two of the plurality of different categories, and the search query including a keyword for an item;
    parsing the search query;
    determining the keyword for the item based at least in part on the parsing of the search query;
    accessing an interaction history for a plurality of users in a data store, the interaction history correlating a past search query with a completed action by the plurality of users based at least in part on a plurality of previous interactions by the plurality of users, the plurality of previous interactions including interactions by the plurality of users with search results of the past search query that were provided by the electronic marketplace responsive to the keyword;
    determining a category of the plurality of different categories, the category being associated with the completed action identified in the interaction history;
    determining that a number of interactions associated with the category that correspond with the completed action identified in the interaction history is more than a threshold amount;
    correlating the category with a preferred layout stored in the data store;
    adjusting the generic item search network page of the electronic marketplace to comprise attributes of the preferred layout; and
    providing for display to the user search results for the query on the generic item search network page of the electronic marketplace using the preferred layout absent a redirection to a specific item search network page.

2. The one or more computer-readable storage media of claim 1, wherein the preferred layout also includes a preferred maximum number of items to display on the specific item search network page.

3. The one or more computer-readable storage media of claim 1, wherein the item is offered by a merchant through the electronic marketplace.

4. The one or more computer-readable storage media of claim 1, wherein the generic item search network page is associated with a generic layout before the generic item search network page is provided for display using the preferred layout, wherein the generic layout is consistent or static across the plurality of different categories.

5. The one or more computer-readable storage media of claim 1, wherein the interaction history for the plurality of users includes previous purchase history, order history, clickstream data, or network page destination data.

6. A computer-implemented method, comprising:
    receiving, at a computing device of an electronic marketplace, the electronic marketplace offering items for sale over a plurality of different categories, a search query submitted by a user via a generic item search network page of the electronic marketplace;
    determining a keyword of the search query based at least in part on the parsing of the search query;

accessing an interaction history for a plurality of users in a data store, the interaction history correlating a past search query with a completed action by the plurality of users based at least in part on a plurality of previous interactions by the plurality of users, the plurality of previous interactions including interactions by the plurality of users with search results of the past search query that were provided by the electronic marketplace responsive to the keyword;

determining that a number of interactions associated with the keyword that correspond with the completed action identified in the interaction history is more than a threshold amount;

correlating the keyword with a preferred layout stored in the data store;

adjusting the generic item search network page of the electronic marketplace to comprise attributes of the preferred layout; and enabling to display to the user search results from the search query on the generic item search network page using the preferred layout absent a redirection to a specific item search network page.

7. The computer-implemented method of claim 6, wherein the preferred layout associated with the category optimizes item attributes of the search results that are identified as important to the plurality of users.

8. The computer-implemented method of claim 6, wherein the plurality of previous interactions includes a frequency of use for a presentation feature on the specific item search network page.

9. The computer-implemented method of claim 8, wherein the presentation feature includes presenting images of the item.

10. The computer-implemented method of claim 8, wherein the presentation feature includes presenting text of item attributes associated with the item.

11. The computer-implemented method of claim 6, further comprising:

after the search results are enabled to be displayed to the user, receiving a subsequent interaction from the user on the generic item search network page, the subsequent interaction including a request to access the specific item search network page; and enabling to display to the user the specific item search network page.

12. The computer-implemented method of claim 6, further comprising:

determining, based upon the plurality of previous interactions by the plurality of users, that the search query is associated with more than one category; and determining that the preferred layout for the search query is a consistent or static layout across the plurality of different categories for the generic item search network page.

13. A computing device comprising:

a memory configured to store computer-executable instructions; and a processor in communication with the memory configured to execute the computer-executable instructions to at least:

receive, at the computing device, a query submitted by a user, the query submitted with a keyword;

determine the keyword for the item based at least in part on a parsing of the query;

access an interaction history for a plurality of users in a data store, the interaction history correlating a past search query with a completed action by the plurality of users based at least in part on a plurality of previous interactions by the plurality of users, the plurality of previous interactions including interactions by the plurality of users with search results of the past search query that were provided by the electronic marketplace responsive to the keyword;

determine a category of a plurality of different categories, the category being associated with the completed action identified in the interaction history;

determine that a number of interactions associated with the category that correspond with the completed action identified in the interaction history is more than a threshold amount;

correlate the category with a preferred layout stored in the data store;

adjust a generic item search network page of the electronic marketplace to comprise attributes of the preferred layout; and enable to display to the user search results responsive to the query using the preferred layout and absent a redirection to a specific item search network page.

14. The computing device of claim 13, wherein the preferred layout identifies a number of items to enable to display to the user as search results.

15. The computing device of claim 13, wherein the preferred layout identifies a number of images for each item or image rotation to enable to display to the user as search results.

16. The computing device of claim 13, wherein the preferred layout identifies an image aspect ratio, dimension, or resolution for one or more items to enable to display to the user as search results.

17. The computing device of claim 13, wherein the preferred layout includes a grid layout or list layout.

18. The computing device of claim 13, wherein the plurality of previous interactions includes at least one of a pagination request, selecting the category on a network page, or activating a link on the network page.

19. The computing device of claim 13, wherein the plurality of previous interactions is limited to interactions within related network pages associated with the category.

20. The computing device of claim 13, wherein the instructions further comprise:

store, at a data store associated with the computing device, the keyword and the category associated with the keyword.

* * * * *